US008985048B2

(12) United States Patent
Perin et al.

(10) Patent No.: US 8,985,048 B2
(45) Date of Patent: Mar. 24, 2015

(54) APPARATUS FOR VISUAL IDENTIFICATION OF VALVES IN MULTI VALVE DISTRIBUTION AND TRANSMISSION SYSTEMS

(76) Inventors: Michael Perin, Port Perry (CA); Jeremy Leyland Hunt, Whitby (CA)

( * ) Notice: Subject to any disclaimer, the term of this patent is extended or adjusted under 35 U.S.C. 154(b) by 301 days.

(21) Appl. No.: 13/475,452

(22) Filed: May 18, 2012

(65) Prior Publication Data

US 2012/0295244 A1 Nov. 22, 2012

Related U.S. Application Data

(60) Provisional application No. 61/488,053, filed on May 19, 2011.

(51) Int. Cl.

*F16K 37/00* (2006.01)
*E02D 29/14* (2006.01)
*G09F 3/08* (2006.01)
*G09F 3/00* (2006.01)

(52) U.S. Cl.

CPC .......................................... *G09F 3/00* (2013.01)
USPC ............................ 116/209; 137/364; 137/559

(58) Field of Classification Search

CPC ........... E02D 29/12; E02D 29/14; E03B 7/02; E03B 7/07; E03B 7/09; E03B 9/08; E03B 9/10; F16K 37/00; G09F 3/00; G09F 3/08; H02G 9/10
USPC .......... 116/209; 40/660, 661.05, 661.11, 663; 52/103, 104; 137/15.08, 363, 364, 371, 137/551, 559; 239/201, 285; 405/303
See application file for complete search history.

(56) References Cited

U.S. PATENT DOCUMENTS

| | | | | | |
|---|---|---|---|---|---|
| 1,894,381 | A | * | 1/1933 | Markle | 137/364 |
| 4,411,288 | A | * | 10/1983 | Gain, Jr. | 137/363 |
| 5,727,351 | A | * | 3/1998 | Neathery et al. | 52/20 |
| 6,036,401 | A | * | 3/2000 | Morina et al. | 404/26 |
| 6,053,207 | A | * | 4/2000 | Benedetti | 137/820 |
| 6,886,577 | B1 | * | 5/2005 | Phillips et al. | 137/15.01 |
| 6,932,099 | B2 | * | 8/2005 | Mahaney | 137/15.08 |
| 2008/0156121 | A1 | * | 7/2008 | Radomsky et al. | 73/865.8 |
| 2012/0297652 | A1 | * | 11/2012 | Halvorsen | 40/661.05 |

FOREIGN PATENT DOCUMENTS

| | | | | | |
|---|---|---|---|---|---|
| FR | 2970271 | A1 | * | 7/2012 | F16K 37/00 |
| JP | 11158902 | A | * | 6/1999 | E02D 29/14 |
| JP | 2001132002 | A | * | 5/2001 | E02D 29/14 |
| JP | 2003254468 | A | * | 9/2003 | F16K 37/00 |
| JP | 2004204568 | A | * | 7/2004 | E02D 29/12 |
| JP | 2006258151 | A | * | 9/2006 | F16K 37/00 |

* cited by examiner

*Primary Examiner* — R. A. Smith
(74) *Attorney, Agent, or Firm* — Miller Thomson LLP; Tai W. Nahm

(57) ABSTRACT

There is disclosed an apparatus and method for visual identification of valves in multi valve distribution and transmission systems, and particularly for municipal utility infrastructures such as mainline, connection, drain, pressure district, pressure regulating and pressure sustaining valves. In an embodiment, color coded valve box inserts are made to specifications, inserted and secured into place at the opening of multiple valve boxes to easily and accurately identify the different types or sizes of valves. Each color represents a different type or size of valve, as established by the municipality. A color coding chart identifying the different types or sizes of valves may be placed at each point of access to the valves to assist in identification of the different types of valves.

19 Claims, 4 Drawing Sheets

APPARATUS FOR VISUAL IDENTIFICATION OF VALVES IN MULTI VALVE DISTRIBUTION AND TRANSMISSION SYSTEMS

CROSS REFERENCE TO RELATED APPLICATIONS

This application claims priority from U.S. Provisional Application No. 61/488,053 filed on May 19, 2011, which is incorporated by reference herein in its entirety.

FIELD

The present disclosure relates to an apparatus and method for visual identification of valves in multi valve distribution and transmission systems, particularly for municipal utility infrastructures.

BACKGROUND

In the field of distribution and transmission systems—particularly for municipal utility infrastructures such as mainline, connection, drain, pressure district, pressure regulating and pressure sustaining valves—a significant recurring problem is lack of identification or poor identification of the different types and sizes of valves in multi valve systems.

For example, the lack of delineation between transmission, distribution, clockwise and counterclockwise operating valves, water, wastewater, and two tier municipal infrastructures results in increased probability of human error, resulting in increased risk to employees, public safety, infrastructure and the environment. The lack of proper identification also results in increased time to resolution of problems in an emergency, elevating costs of mitigation due to failures.

Existing solutions to identification of valves in multi valve systems are limited in their accuracy (e.g. GIS or GPS based location systems), or may be subject to failure due to inherent design limitations.

What is needed is an improved apparatus and method for visual identification of valves which overcomes at least some of the drawbacks and limitations as described above.

SUMMARY

The present disclosure relates to an apparatus and method for visual identification of valves in multi valve distribution and transmission systems, and particularly for municipal utility infrastructures such as mainline, connection, drain, pressure district, pressure regulating and pressure sustaining valves.

In an embodiment, color coded valve box inserts are made to specifications, inserted and secured into place at the opening of multiple valve boxes to easily and accurately identify different types and sizes of valves. Each color represents a different type of valve, a different size of valve, or some other characteristic of the valve as established by the municipality. A color coding chart identifying the different types and sizes of valves may be placed at each point of access to the valve boxes to assist in identification of the different types of valves.

Thus, in an aspect, there is provided an apparatus for visual identification of valves in a multi valve distribution or transmission system, wherein: the apparatus is adapted to be inserted at an opening to a valve box in the multi valve distribution or transmission system; and the apparatus is formed of a material having one or more selected colors; whereby, the apparatus secured at the opening to the valve box visually identifies a valve in the multi valve distribution or transmission system by the one or more selected colors.

In another aspect, there is provided a method of visually identifying valves in a multi valve distribution or transmission system, comprising: providing a color coding system for identifying different types or sizes of valves in the multi valve distribution or transmission system; selecting valve box inserts formed of a material having one or more selected colors corresponding to the color coding system; and securing the valve box inserts at the opening to the valves to visually identify each valve in the multi valve distribution or transmission system by the valve box inserts having the one or more selected colors.

In this respect, before explaining at least one embodiment of the invention yin detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DETAILED DESCRIPTION

As noted, the present disclosure relates to an apparatus and method for visual identification of valves in multi valve distribution and transmission systems, particularly for municipal utility infrastructures such as mainline, connection, drain, pressure district, pressure regulating and pressure sustaining valves.

In an embodiment, color coded valve box inserts are made to specifications and inserted and secured into place at the opening of multiple valve boxes to easily and accurately identify the different types of valves accessed via the valve boxes.

Figure 1:
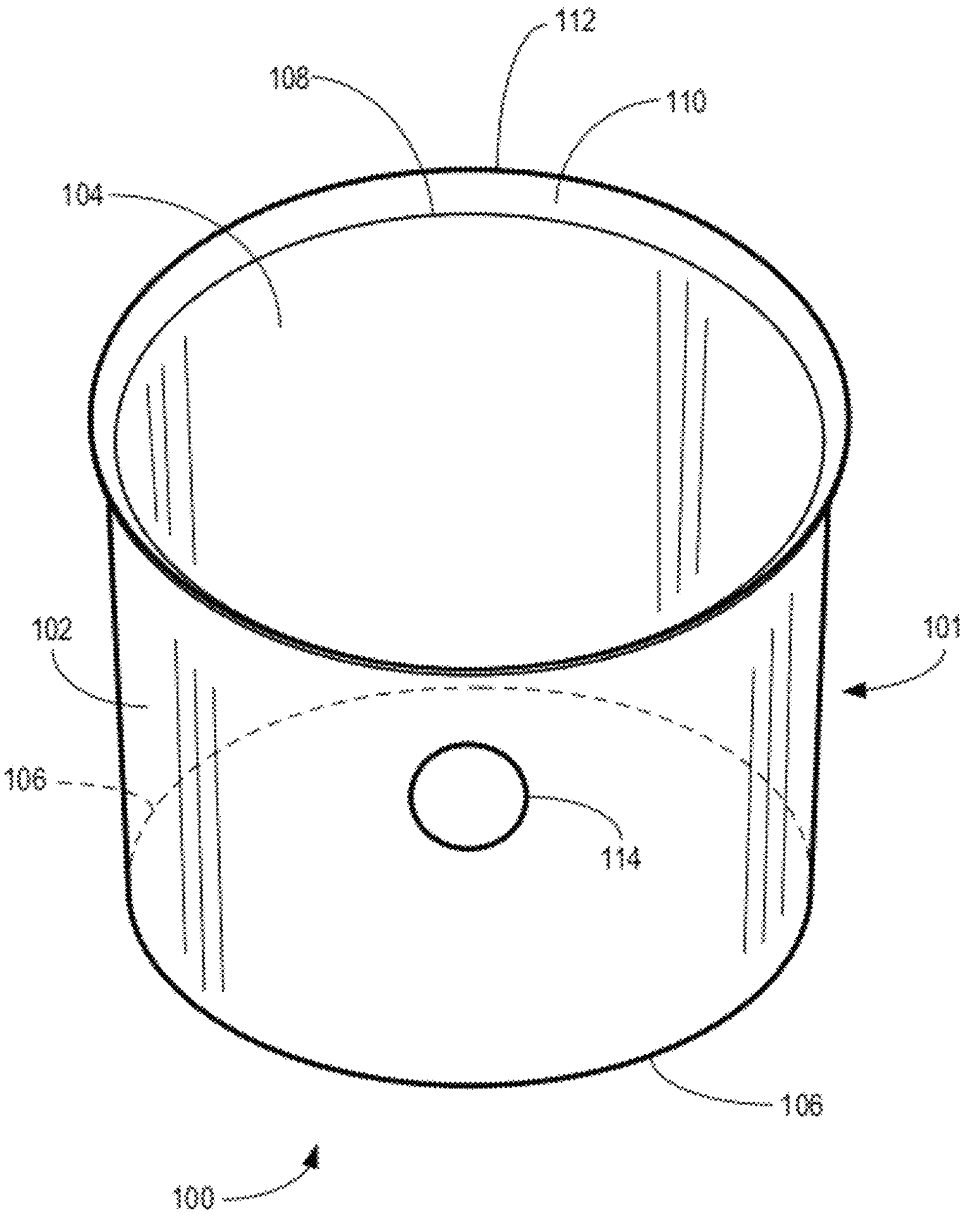
FIG. 1 shows a perspective view of an apparatus in accordance with an embodiment.

Referring to FIG. 1, shown is a perspective view of an illustrative valve box insert 100. As shown, valve box insert 100 has a tubular main body 101 with an outer main body surface 102 and an inner main body surface 104. Valve box insert 100 further has a lower edge 106 and an upper edge 108 defining the lower and upper ends of the tubular main body 101.

Still referring to FIG. 1, valve box insert 100 further includes an extending flange 110 having a dimension larger than the upper edge 108 and terminating at an outer edge 112 of extending flange 110. In this illustrative embodiment, extending flange 110 is angled upwards to better fit valve boxes in which valve box insert 100 will be inserted.

As shown, in this illustrative embodiment, valve box insert 100 may also include an orifice 114 in main body 101. In use, orifice 114 may allow access to a component or feature in one or more valve boxes in which valve box insert 100 is inserted.

Additional orifices may be provided in main body 101 as may be necessary in order to allow access to various other components or features.

Figure 2:
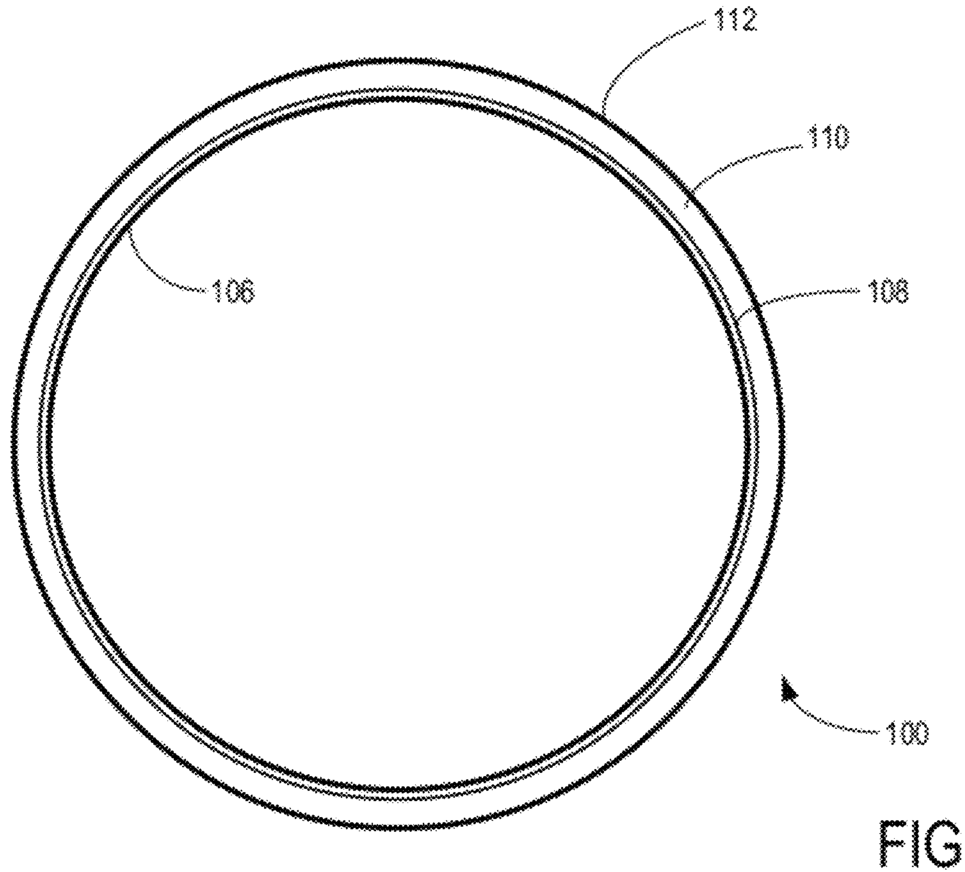
FIG. 2 shows a top view of the apparatus of FIG. 1.
Figure 3:
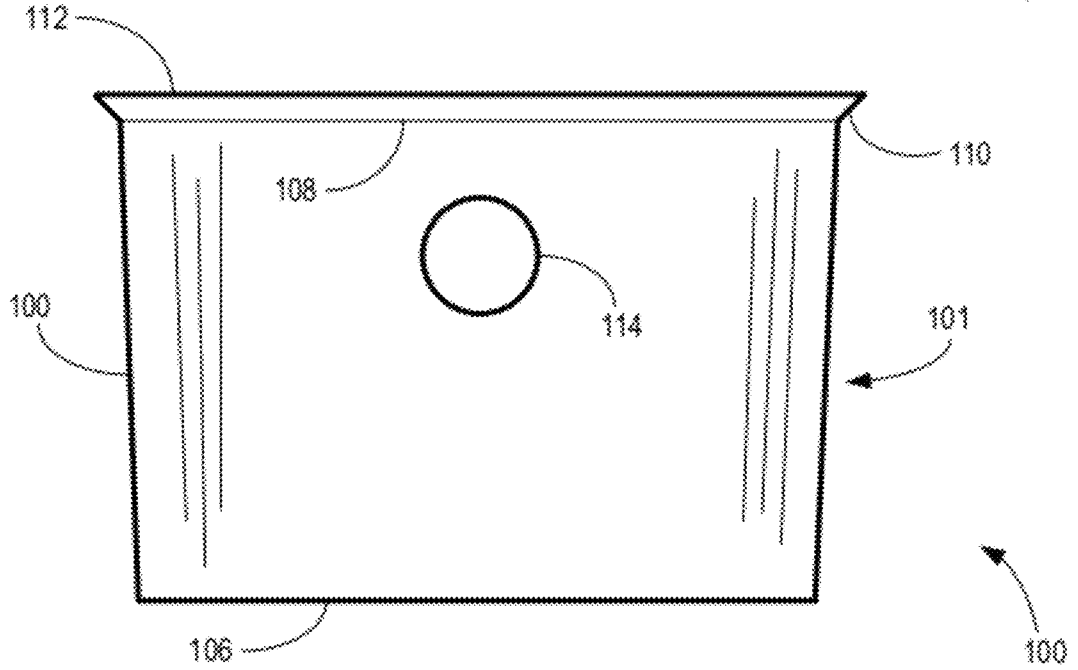
FIG. 3 shows a side view of the apparatus of FIG. 1.

Now referring to FIGS. 2 and 3, shown are a top view and a front view, respectively, of the valve box insert 100 of FIG. 1. As shown in FIG. 3, in an embodiment, the main body 101 of valve box insert 100 may be tapered, such that upper edge 108 of valve box insert 100 has a width or diameter somewhat larger than the width or diameter of lower edge 106. This tapered shape allows valve box insert 100 to be more easily inserted into a valve box, and for valve box insert 100 to be secured within a valve box by a suitably tight fit. For example, the diameter of lower edge 106 may be selected to provide a clearance fit when placed in a valve box. However, the diameter of upper edge 108 may be selected to provide a suitably sufficient interference fit when inserted into a valve box, so that valve box insert 100 is secured within a valve box once fully inserted and not easily removed.

In an embodiment, the diameter of the extending flange 110 is selected to be larger than would fit fully within a valve box, thus positively stopping valve box insert 100 from being inserted in a valve box beyond the upper edge 108. Any angle formed in the extending flange 110 may be selected to complement the angle formed by a valve box opening.

In an embodiment, valve box insert 100 may be manufactured from a material that is moldable, resistant to tearing, and somewhat flexible—such as a thermoplastic for example. Because valve box insert 100 may be used in applications in which the valve boxes are subject to both hot and cold temperatures, the chosen material should suitably accommodate extremes in temperature, while still retaining its mechanical integrity—including rigidity, breakage and tear resistance, and fire retardancy.

In another embodiment, valve box insert 100 may be manufactured from a material that is available multiple different colors, such that the material need not be painted on its surface. As the color would be an inherent characteristic of the material, valve box insert 100 would require virtually no maintenance to permanently retain its color once inserted.

In addition the material chosen should preferably be chemically resistant to various types of fluids and contaminants that may be carried within the valves. This may include, for example, water, sewage, environmental run-off, and various road contaminants including salt, oil and grease.

By way of illustration, and not by way of limitation, one material that has been tested and found to be suitable by the inventors for manufacturing the valve box insert 100 is KYDEX® 100, a thermoplastic material, typically used for applications such as aircraft interiors, mass transit vehicle components, equipment housings and medical products. Based on testing by the inventors, KYDEX 100 has been found to provide the necessary mechanical integrity, color adaptability, and resistance to temperature changes or extremes. KYDEX 100 also provides high impact and breakage resistance and a high standard for chemical resistance amongst thermoplastic materials. KYDEX 100 also accommodates molding, machining and fabrication using conventional methods and equipment.

In order to provide a sufficiently distinctive number of colors to easily distinguish between different types of valves, it is necessary to select a material available in a wide range of colors. KYDEX 100 is available in a wide range of standard and custom colors and textures, allowing valve box inserts 100 to be manufactured in various different colors. As an illustrative example, an eight color set may include red, orange, yellow, green, blue, purple, black and white. A larger number of colors may be included in a set if required but selecting additional colors such as brown, beige and gray, for example.

In an embodiment, each municipality may create a color coding system using a color set having an appropriate number of different colors to identify each type of valve. A color coding chart may also be created to allow front line staff to easily identify each type of valve by cross referencing the color coded chart to different types of valves. The color coded chart may thus be used to quickly and accurately identify the different types of valves front line personnel may come across.

Figure 4:
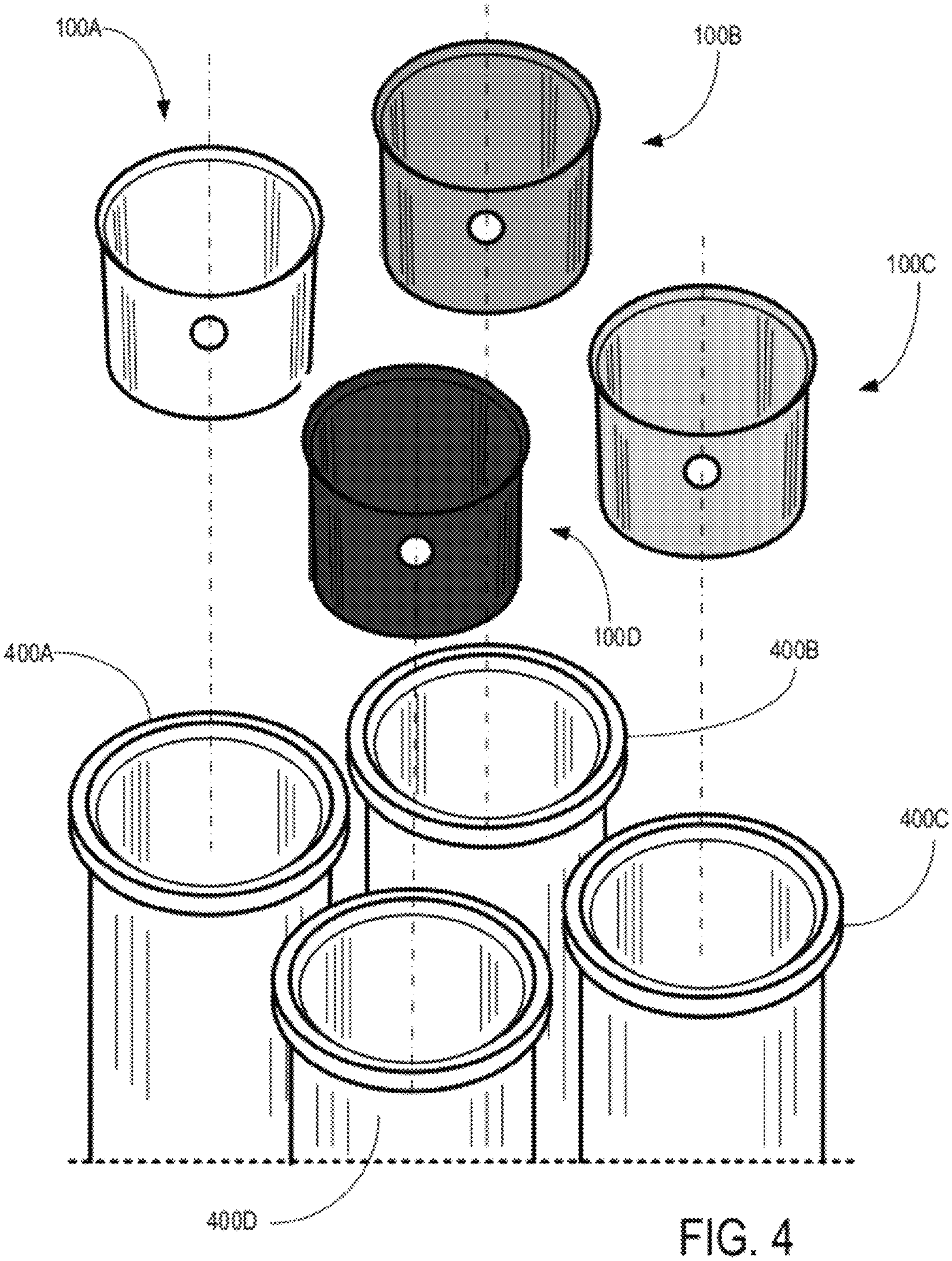
FIG. 4 shows a schematic view of a method in accordance with an embodiment.

Now referring to FIG. 4, shown is an illustrative method in accordance with an embodiment. As shown, a number of valve box inserts 100A-100D may be made from various different colors such that they are easily distinguished from each other visually. As shown in this illustrative example, each of valve box inserts 100A-100D may be selected to be inserted into the opening of four valve boxes 400A-400D in a multi valve distribution or transmission system. For example, valve boxes 400A-400D may provide access to different valves for a municipal water or sewage system. By installing the valve box inserts 100A-100D in each corresponding valve box 400A-400D, each of the valve boxes 400A-400D are visually distinguished by the different colors of the valve box inserts 100A-100D, and front line staff can readily distinguish between different types of valves by the color of the valve box inserts 100A-100D.

Quick and accurate identification of different types of valves via the valve box inserts 100A-100D minimizes the chances of human error, and reduces the risk to staff, the public, the environment, infrastructure assets and the owner. There is a corresponding decrease in mitigation costs for emergency failures, and increased operator confidence.

With the selection of an appropriate material, the valve box insert 100 can be manufactured to last virtually the life of the valve box and valve it identifies. Thus, valve box insert 100 can represent a one time cost for a life time of accurate field identification for virtually all buried municipal infrastructure comprising multi valve distribution and transmission systems.

In another embodiment, rather than being formed from a single color, valve box insert 100 may also be manufactured from two or more colors such that, for example, each valve box insert 100 has a top portion/bottom portion having different colors, or a left portion/right portion having different colors. This may significantly increase the number of different valve box inserts 100 that may be used in a color scheme to identify different types of valves. As each valve box insert 100 may have a top portion identified by an extending flange 110, the order (e.g. top/bottom) in which two colors are used may also distinguish between two valve box inserts 100 made of the same two colors.

In a further embodiment, it will be appreciated that additional colors and/or patterns may be used to identify between different valve box inserts 100, as long as each of the valve box inserts 100 are readily visually distinguishable from each other.

In yet another embodiment, each valve box insert 100 may also be identified by the use of a graphic symbol, or text in addition to the visual identification of color(s) and/or pattern(s). As well, a different number or pattern of cut-outs or orifices may also be used to identify different types of valves.

In still another embodiment, each valve box insert 100 may be built to specifications to fit different sizes of valves, and to accommodate different types of valve openings, components and features. In each case, valve box insert 100 may be built to provide a suitable interference fit when fully inserted, so that the valve box insert 100 is not easily removed after installation.

Figure 5:
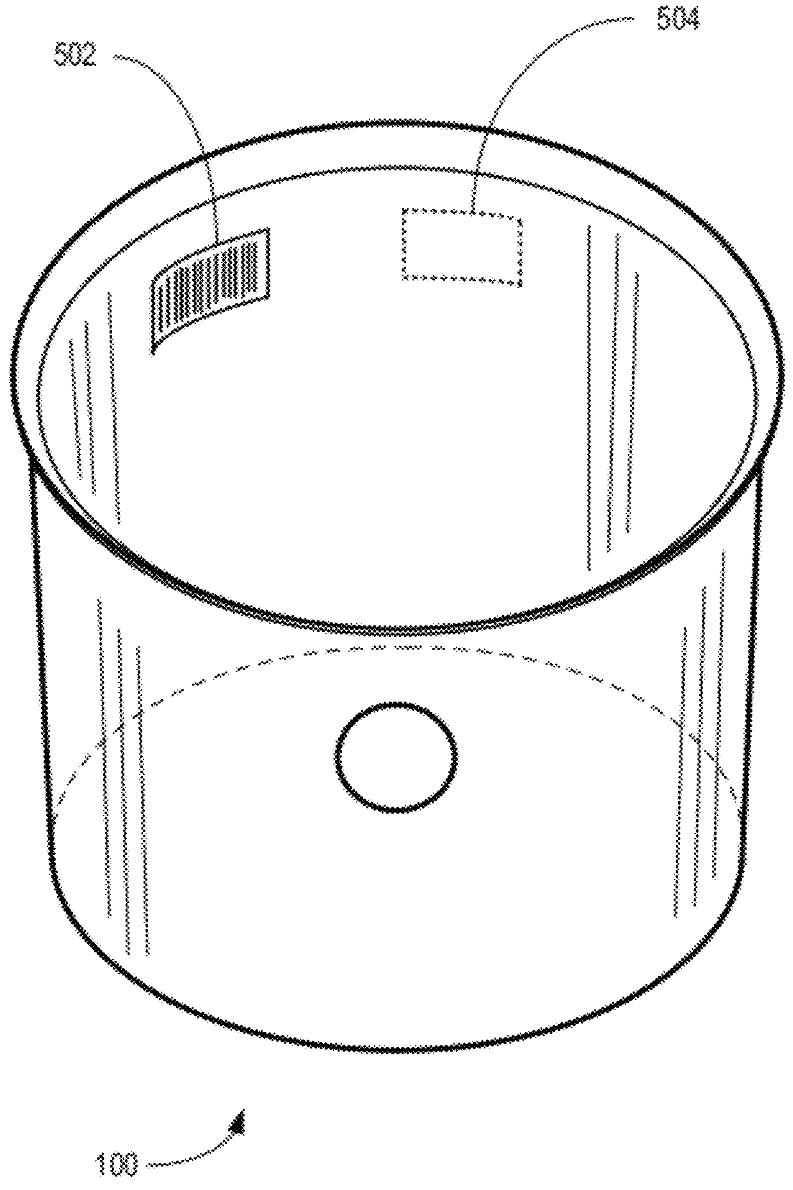
FIG. 5 shows a perspective view of the apparatus of FIG. 1 with other identification means.

In another embodiment, as shown in FIG. 5, valve box insert 100 may further include other identification means, such as a barcode or QR code 502 to further identify the specific valve with a portable barcode or QR code reader, which may be a mobile communication device for example. The bar code/QR code may contain a serial number that correlates the valve box insert 100 to a specific valve, as stored in a database accessible via the barcode or QR code.

In another embodiment, an embedded radio frequency ID (RFID) chip 504 may be used to store identification information as well as other data about the valve to make it easier for field personal to verify that the correct valve has been located and obtain other relevant information about the valve.

Thus, in an aspect, there is provided an apparatus for visual identification of valves in a multi valve distribution or transmission system, wherein: the apparatus is adapted to be inserted at an opening to a valve box in the multi valve distribution or transmission system; and the apparatus is formed of a material having one or more selected colors; whereby, the apparatus secured at the opening to the valve box visually identifies a valve in the multi valve distribution or transmission system by the one or more selected colors.

In an embodiment, the apparatus further comprises a tapered upper edge which prevents the apparatus from sliding fully inside a valve.

In another embodiment, the apparatus is adapted to be secured within the valve.

In another embodiment, the diameter of the upper edge of the apparatus is selected to provide a suitably sufficient interference fit when the apparatus is fully inserted into a valve.

In another embodiment, the apparatus further includes an orifice adapted to allow access to a component or feature in one or more valves into which the apparatus is inserted.

In another embodiment, the apparatus comprises a flexible, moldable material resistant to tearing, high impacts and breakage.

In another embodiment, the apparatus comprises a material resistant to temperature changes or extremes.

In another embodiment, the apparatus comprises a chemically resistant material.

In another embodiment, the apparatus comprises a thermoplastic material.

In another embodiment, the apparatus comprises a color adaptable material corresponding to a color coding system developed for the multi valve distribution or transmission system.

In another embodiment, the color coding system comprises a color coded chart identifying each type or size of valve using a color.

In another embodiment, the color coding system comprises a color, coded chart identifying each type or size of valve using a color combination.

In another embodiment, the color coding system comprises a color coded chart identifying each: type or size of valve using a color pattern.

In another embodiment, the apparatus is further identified by a graphic symbol or text.

In another embodirnent, the apparatus is further identified by a pattern of cut-outs or orifices.

In another embodiment, the apparatus is further identified by a barcode or QR code.

In another embodiment, the apparatus is further identified by an embedded RFID chip, the RFID chip storing identifying information and data relating to the valve in which the apparatus is inserted and secured.

In another aspect, there is provided a method of visually identifying valves in a multi valve distribution or transmission system, comprising: providing a color coding system for identifying different types or sizes of valves in the multi valve distribution or transmission system; selecting valve box inserts formed of a material having, one or more selected colors corresponding to the color coding system; and securing the valve box inserts at the opening to the valves to visually identify each valve in the multi valve distribution or transmission system by the valve box inserts having the one or more selected colors.

In an embodiment, the method further comprises providing a color coding chart to identify the different types or sizes of valves.

In another embodiment, the method further comprises utilizing one or more of color patterns, graphic symbols, text, cut-outs, RFID codes and QR codes to further identify each valve in the multi valve distribution or transmission system.

While the above description provides examples of one or more embodiment and methods, it will be appreciated that other embodiments and methods may be within the scope of the present description as interpreted by one of skill in the art.

The invention claimed is:

1. An apparatus for visual identification of valves in a multi valve distribution or transmission system, wherein:

the apparatus is adapted to be inserted at an opening to a valve box in the multi valve distribution or transmission system;

the apparatus is formed of a material having one or more selected colors; and the apparatus comprises a tapered upper edge which prevents the apparatus from sliding fully inside a valve;

whereby, the apparatus secured at the opening to the valve box visually identifies a valve in the multi valve distribution or transmission system by the one or more selected colors.

2. The apparatus of claim 1, wherein the apparatus is adapted to be secured within the valve.

3. The apparatus of claim 2, wherein the diameter of the upper edge of the apparatus is selected to provide a suitably sufficient interference fit when the apparatus is fully inserted into a valve.

4. The apparatus of claim 1, wherein the apparatus further includes an orifice adapted to allow access to a component or feature in one or more valves into which the apparatus is inserted.

5. The apparatus of claim 1, wherein the apparatus comprises a flexible, moldable material resistant to tearing, high impacts and breakage.

6. The apparatus of claim 1, wherein the apparatus comprises a material resistant to temperature changes or extremes.

7. The apparatus of claim 1, wherein the apparatus comprises a chemically resistant material.

8. The apparatus of claim 1, wherein the apparatus comprises a thermoplastic material.

9. The apparatus of claim 1, wherein the apparatus comprises a color adaptable material corresponding to a color coding system developed for the multi valve distribution or transmission system.

10. The apparatus of claim 9, wherein the color coding system comprises a color coded chart identifying each type or size of valve using a color.

11. The apparatus of claim 9, wherein the color coding system comprises a color coded chart identifying each type or size of valve using a color combination.

12. The apparatus of claim 9, wherein the color coding system comprises a color coded chart identifying each type or size of valve using a color pattern.

13. The apparatus of claim 1, wherein the apparatus is further identified by a graphic symbol or text.

14. The apparatus of claim 1, wherein the apparatus is further identified by a pattern of cut-outs or orifices.

15. The apparatus of claim 1, wherein the apparatus is further identified by a barcode or QR code.

16. The apparatus of claim 1, wherein the apparatus is further identified by an embedded RFID chip, the RFID chip storing identifying information and data relating to the valve in which the apparatus is inserted and secured.

17. A method of visually identifying valves in a multi valve, distribution or transmission system, comprising: providing a color coding system for identifying different types or sizes of valves in the multi valve distribution or transmission system; selecting valve box inserts formed of a material having one or more selected colors corresponding to the color coding system and a tapered upper edge which prevents the inserts from sliding fully inside the valves; and securing the valve box inserts at the opening to the valves to visually identify each valve in the multi valve distribution or transmission system by the valve box inserts having the one or more selected colors.

18. The method of claim 17, further comprising providing a color coding chart to identify the different types or sizes of valves.

19. The method of claim 17, further comprising utilizing one or more of color patterns, graphic symbols, text, cut-outs, RFD codes and QR codes to further identify each valve in the multi valve distribution or transmission system.

* * * * *